United States Patent Office 3,268,357
Patented August 23, 1966

3,268,357
ARTICLE COATED WITH ALKYL ACRYLATE-VINYL ESTER INTERPOLYMER CONTAINING ADHESIVE
Donald P. Hart, Allison Park, and Joseph E. Plasynski, New Kensington, Pa., assignors to Pittsburgh Plate Glass Company, Pittsburgh, Pa., a corporation of Pennsylvania
No Drawing. Original application Feb. 27, 1962, Ser. No. 176,094. Divided and this application Dec. 17, 1964, Ser. No. 419,198
10 Claims. (Cl. 117—122)

This application is a division of copending application Serial No. 176,094, filed February 27, 1962, and now abandoned.

This invention relates to a pressure-sensitive adhesive composition which particularly finds utility with non-fibrous backings. Particularly, the invention relates to a pressure-sensitive adhesive composition comprising (1) a solution polymerized interpolymer comprising from about 40 percent to about 85 percent of at least one compound having the formula:

(I) 

wherein R is an alkyl radical having at least 4 carbon atoms, and from about 60 percent to about 15 percent of a compound having the formula:

(II) 

wherein $R_1$ is an alkyl radical having from 1 to 5 carbon atoms, and (2) a solvent containing at least 90 percent of a compound selected from the group consisting of esters of organic acids, aliphatic hydrocarbons, ketones, alcohols, and mixtures thereof, said polymer having a viscosity of at least 3000 centipoises as a 50 percent solution in isopropyl acetate and a standard Williams plasticity number of 1.4 to 3.0.

Pressure-sensitive adhesives, which are normally used in the form of adhesive tapes or veneers and wallpapers, have recently attained considerable industrial importance; and production of these materials is continuing to increase as new uses are being found.

Their function is to provide instantaneous adhesion when applied under light pressure, and most applications further require that they can be cleanly removed from the surface to which they have been applied by a light pull. They are characterized by having a built-in capacity to secure this instantaneous adhesion to a surface without activation, such as treatment with solvents or heat, and also by having sufficient internal strength so that the adhesive material will not rupture before the bond between the adhesive material and the surface ruptures. The capacity to obtain instantaneous adhesion is usually expressed as the amount of "tack" or "tackiness."

Ordinarily it is desirable to obtain as much tack as possible without losing a significant amount of internal strength (cohesion). One very simple test which may be used to evaluate materials which are to be used as a pressure-sensitive adhesive, comprises coating a backing with the material and folding the adhesive surface against itself until there is a bond obtained between the two surfaces of adhesive material. The two surfaces are then pulled apart. The adhesive is then observed for the degree of "leg," that is, the distance the adhesive material extends from the backing before the two surfaces part. If the "leg" is too great, the adhesive lacks sufficient internal strength. Extreme "leg" is manifested by the formation of "spider web-like" fibers bridging the two surfaces. If, however, the surfaces pull apart with no more force than was needed to bring the two surfaces together, there is insufficient "tack" or adhesiveness.

The adhesive coating which is applied to the backing material should have in addition to permanent tack and adhesiveness, internal strength (cohesiveness), resilience, cushioning power, and usefulness over a wide range of temperatures. In order to obtain all of these qualities, it has been necessary to make these pressure-sensitive adhesives from several components and additives since no single compound or known composition was found to have all the qualities which are necessary for a material to function as a pressure-sensitive adhesive. Polyisobutylene and the polyvinyl ethers have been used extensively as pressure-sensitive adhesives, but it has been found necessary in most instances to incorporate certain additives to impart tack, adhesion and wetting power to these materials; mixtures of more than one molecular weight polymer have been used.

A wide variety of backing materials are used for these tapes and the intended application usually determines which type of backing is selected. For example, 80 x 80 cotton cloth is frequently selected for surgical tapes; vinyl film, acetate, rayon and fiber glass cloths are often used in the electrical industry; silk is used in the photographic industry; cellophane and cellulose acetate films are generally used in transparent tapes; paper which has been impregnated with rubber, protein or resins is used in masking tapes; and vinyl films, particularly vinyl chloride films, are used for making veneers or other decorative coverings. Metal foils have also been used with pressure-sensitive tapes and have shown considerable promise in this application.

In many instances, the backing material has to be precoated on one side with a material called a "primer" or "subbing coat," to increase its affinity for the pressure-sensitive adhesive, and the pressure-sensitive adhesive is applied over this precoat. This method was applied in particular to the non-fibrous backings, such as regenerated cellulose, cellulose acetate, rubber hydrochloride, polyvinyl chloride, or poly(vinyl ester) films, wherein the smoothness of the uncoated surface made adhesion of the adhesive mass to the uncoated surface difficult. In other words, the primer or subbing coat acted as an adhesive to bond the pressure-sensitive adhesive to the backing material.

Much work has been done to try to find a single polymer which has all of the aforementioned properties necessary for a material to function as a pressure-sensitive adhesive; but none has been entirely successful. Resinous compositions having nothing more than certain plasticizers added thereto have been made which have good adhesion to certain backings, but migration of these plasticizers into the backings, especially the non-fibrous backings, has seriously restricted their use. Exudation of the plasticizer to the surface of the adhesive is also a serious problem.

It has been found that plasticized polyvinyl acetate may be used on non-fibrous backings without the need for a primer or subbing coat, but it lacks permanent tack, resilience and cushioning power to be considered as a pressure-sensitive adhesive. The chlorinated biphenyl resins serve as exceptionally good plasticizers for the polyvinyl acetate, but they show a marked tendency to migrate into the non-fibrous backings, or exude to the surface on aging for a few days.

Efforts have been made to copolymerize certain plasticizing monomers with vinyl acetate to form a polymer having an internally built-in plasticizer. It was found that the low molecular weight copolymers of vinyl acetate with these plasticizing monomers lack sufficient internal strength (cohesiveness) to be used as a pressure-sensitive adhesive, since adhesive would be left upon any substrate to which it had been applied. This problem was to a certain extent overcome through emulsion polymerization, whereby extremely high molecular weights are obtained. But, however, the water of the emulsion makes for an unduly long flashing period for application onto the adhesive backings, and therefore does not readily lend itself to commercial methods. Another disadvantage in preparing the adhesive in an emulsion medium lies in the fact that a surface-active agent and a protective colloid must be employed to form the emulsion, and these agents cannot be removed, practically speaking, and therefore make the adhesive much more sensitive to water; whereas, the compositions of the instant invention are extremely water resistant.

It has now been discovered that high molecular weight vinyl acetate copolymers can be utilized in the form of solutions rather than in emulsions if they are made so that they fall within the above-mentioned viscosity range. If the viscosity of the copolymer is below about 3000 centipoises as a 50 percent isopropyl acetate solution, the adhesive forces exceed the cohesive forces and the said copolymer is therefore unacceptable.

The resinous polymeric materials of the instant invention are characterized by a solution polymerized interpolymer such as described above and having a viscosity of at least about 3000 centipoises as a 50 percent solution in isopropyl acetate. Because of the great diversity in polymerization rates, the compound represented by Formula I must be added at a controlled rate to the compound represented by Formula II, or both of the reactive monomers must be added at a controlled rate to the reaction medium. One convenient method of preparation of the polymeric compositions of the instant invention is to heat, while agitating, the compound represented by Formula II and add incrementally a solution containing a compound represented by Formula I with a solvent and a particular catalyst. In addition to controlling the amounts of the reactive monomers in the reaction medium, it is also important to maintain a rigid control over the solvent to monomer ratio; it is necessary that the polymerization be conducted in a solution medium having less than about 50 percent solvent as opposed to reactive monomers. It is possible, however, to vary the percent solvent from 0 to 50. The solvents should not be of a nature which would result in excessive chain transfer.

It is an important aspect of the present invention that the resinous compositions have a standard Williams plasticity of at least 1.4. Copolymers prepared in accordance with the instant invention having the lower acceptable viscosities (3000 to 4000 centipoises) as a 50 percent solution in isopropyl acetate, require amounts of the vinyl ester component larger than the minimum 45 percent in order to acquire the required Williams plasticity. As the viscosity of the copolymers is increased, the maximum amounts (90 percent) of the vinyl ester becomes excessive and the vinyl ester component must be decreased. In order to control the maximum and minimum amounts of the monomer components of polymers having viscosities on the upper and lower ends of the acceptable range, the proportions should be adjusted to keep their Williams plasticity within the range of from 1.4 to 3.

The standard Williams plasticity number is defined as the resulting height in millimeters of a 2-gram sample of the resinous material after a 5000 gram flat weight has been applied to the sample in the form approximating a sphere which is held at 100° F.

While the compounds represented by Formula I include all of the acrylates from butyl up to octadecyl and even higher, it is preferred that the acrylates which have been formed from alcohols having from 8 to 14 carbon atoms be used; examples of these acrylates include 2-ethylhexyl-, octyl-, nonyl-, decyl-, undecyl-, dodecyl-, tridecyl-, and tetradecyl-. Compounds represented by Formula II include the vinyl esters of acetic acid, propionic acid, butanoic acid, pentanoic acid, the vinyl ester of acetic acid, however, being the preferred monomer. The acrylates must be present in amounts of at least 40 percent; but, however, it is preferred that they be present in amounts ranging from 50 to 65 percent by weight of the total polymer. Accordingly, the vinyl esters should be present in amounts ranging up to about 60 percent by weight of the total polymer, but not less than 15 percent by weight.

The rate at which the acrylate may be added to the vinyl ester is contingent upon the weight proportions of the individual monomers, that is, the acrylate to the vinyl ester, and also to a great extent, the variation of reaction rates among the various acrylates and among the various esters.

The temperature of reaction is governed by the solvent which is to be employed in the reaction. It is preferable that the solvent or solvent mixture be one that forms a medium with reactive monomers which refluxes below 120° C. but above 65° C. The reaction temperature governs the choice of catalyst which may be used for the reactions of the polymers of the instant invention. While benzoyl peroxide is the prefered catalyst for carrying out said reaction, any one of a variety of free radical catalysts which operate within the temperature range of about 65° C. to about 120° C. may be employed. Examples of such catalysts include tertiary butyl hydroperoxide, alpha, alpha-azo-bis isobutyronitrile, cumene hydroperoxide, ditertiary butyl peroxide, and dicumyl peroxide.

The nature of the solvent system which is to be used with the resinous polymers of the instant invention may be varied in accordance with the objective which is to be accomplished. While isopropyl acetate has the desirable quality of "biting" into many of the non-fibrous backing films, in order that the adhesive will adhere strongly to the backing, it is also advantageous at times to use straight aliphatic hydrocarbons which have no appreciable effect upon the non-fibrous backings, particularly polyvinyl chloride. These include straint chain aliphatic hydrocarbons and the cyclo-aliphatic hydrocarbons, such as cyclohexane and the like. In addition to the use of esters and aliphatic hydrocarbons, it is desirable to add a certain amount of a high vapor pressure solvent, preferably one of the lower alkyl alcohols, such as methanol through propanol, or ketones such as acetone and the like. These high vapor pressure solvents are usually added after the polymerization is complete, and are used to adjust the final solids content to a value between 20 and 50 percent of the total weight of the adhesive composition. It has been found that certain amounts (up to 10 percent by weight of the solvent) of a chain transfer agent, such as a lower alcohol or an aromatic compound, may be used with the solvent system to keep the molecular weight low enough so the polymer stays in solution. Viscosities above 110,000 centipoises as a 50 percent solution in isopropyl acetate are beyond the upper limit; higher molecular weights form gels and are therefore inoperative.

It should be noted that the resinous compositions of the instant invention are provided in a much higher solids content than many of the previously prepared pressure-sensitive adhesive compositions, particularly the polyvinyl ether adhesives which can be applied at the most 15 to 20 percent solids. It is easily seen that when the composition must be marketed at low solids content (the adhesives are used on the backing at 100 percent solids) that their expense is prohibitive and when combined with the fact that many of these pressure-sensitive adhesives must be compounded from any different materials, such as for instance, the polyvinyl ether adhesives, that the single-component high-solids content adhesives of the instant invention provide a step forward in the art.

As previously mentioned, it was thought that when interpolymers prepared from the components which are used to prepare the compositions of the instant invention, they had to be prepared using emulsion polymerization techniques in order to obtain a molecular weight high enough to provide cohesive strength greater than the adhesive strength of the adhesive composition itself. The interpolymers which are prepared using emulsion techniques for the polymerization usually result in products having excessively high molecular weights, which when precipitated and dried from the emulsion medium prove to be insoluble in solvents which are used as the polymerization medium of the instant invention. In addition to the fact that the aqueous medium of the emulsion composition provides an unduly slow flashing procedure, it is also a disadvantage of the emulsion system in that the emulsions tend to break down over prolonged periods and are also subject to coagulaion from freezing temperatures and contamination; these two points significantly affect the marketability of the said adhesive compositions.

The resinous compositions of the instant invention are applied by roll coating, spraying, drawing, or doctor blade to almost any backing. Particularly useful are the non-fibrous backings, such as cellophane (regenerated cellulose), Mylar (terphthalic polyester), neoprene sheet (polychloroprene), and the various polyvinyl chloride materials such as, for example, Lustran. The adhesive is applied sufficiently thick so that after flashing the dry adhesive film is from ½ to 2 mils thick. The films are usually flashed for 30 to 60 seconds at a temperature ranging from 250° F. to about 300° F.

The various products which may be prepared from the instant adhesives may be applied to hardboard, most kinds of plastics, metals, or almost any other surface which is not overly rough.

The resinous adhesive compositions of the instant invention are also particularly adaptable to be used on surgical tapes, etc., which may be applied without irritation to the skin. These compositions usually have a Williams plasticity number approaching 2, which is desirable for this application.

The said adhesive compositions also find utility as a "bottled adhesive" which may be used directly onto the surface of a large variety of materials, including paper and other various fibrous backings.

While various and sundry compositions are conceivable within the scope of the instant invention, the preparation and use of the preferred embodiments thereof are set forth in the following examples. All parts and percentages are by weight unless otherwise specified.

*Example 1*

This example relates to the preparation of a 60–40 ethylhexyl arcrylate-vinyl acetate copolymer.

A solution consisting of 600 parts ethylhexyl acrylate, 566 parts isopropyl acetate and 5 parts of benzoyl peroxide was added dropwise over a period of 3 hours and 20 minutes to a refluxing solution consisting of 400 parts vinyl acetate and 300 parts isopropyl acetate. The refluxing was continued for 4½ hours more with agitation. After one additional hour of reflux, a solution consisting of 3.8 parts benzoyl peroxide and 46 parts isoproyl acetate was added over the first half-hour of each successive hour-and-a-half interval. After completion of the reaction, 500 parts isopropyl alcohol were added to the reaction mass. The final product had the following properties:

Total solids (percent) _____ 39.6
Viscosity (Gardner-Holdt) _____ W–X

The sample was cut to 30 percent solids with isopropyl alcohol and flashed on polyvinyl chloride film for 1 minute at 265° F.

The initial tack and leg were excellent. The adhesive maintained this tack and leg over the temperature range of from 30° F. to 175° F.

*Example 2*

This example relates to the preparation of a copolymer of 60 percent ethylhexyl acrylate and 40 percent vinyl acetate.

In a suitable vessel, 400 parts vinyl acetate were heated with agitation to 70° C. In a solution consisting of 600 parts ethylhexyl acrylate, 400 parts aliphatic hydrocarbon (Gulf's VM and P) and 5 parts benzoyl peroxide were added dropwise thereto over a period of 4 hours and 15 minutes. After another half-hour, 150 parts more of aliphatic hydrocarbon (Gulf's VM and P) were added to the reaction mass. After another half-hour, 2 parts benzoyl peroxide in 14 parts acetone and 186 parts aliphatic hydrocarbon (Gulf's VM and P) were added dropwise to the reaction mass over a ½ hour period. The reaction was continued for three more 1-hour intervals; after the first two intervals, 2 parts benzoyl peroxide in 14 parts acetone and 78 parts aliphatic hydrocarbon (Gulf's VM and P) were added dropwise over a period of 15 minutes. After completion of the reaction, 200 parts of isopropyl alcohol and 224 parts of ethyl alcohol were added to the reaction mass. The resultant product had the following properties:

Total solids (percent) _____ 41.1
Viscosity (Gardner-Holdt) _____ U+

*Example 3*

This example relates to the preparation of a 50–50 copolymer of n-octyl acrylate and vinyl acetate.

A solution comprising 250 parts n-octyl acrylate, 250 parts ethyl acetate and 5 parts benzoyl peroxide was added dropwise to a flask containing 250 parts vinyl acetate and 250 parts ethyl acetate. During the addition, the reaction mixture was kept at a temperature between 72° C. and 74° C. with continuous agitation. After 1 hour, 2.5 parts benzoyl peroxide were added to the reaction mixture. The reaction was then refluxed for 2 more hours, after which 2.5 parts more benzoyl peroxide were added and the mixture was refluxed for another 2-hour interval. The resultant product had the following properties:

Total solids (percent) _____ 49
Viscosity (Gardner-Holdt) _____ $Z_5$

Six (6) parts of isopropyl alcohol were added to 30 parts of the above resinous solution and applied to an unprimed polyvinyl chloride sheet. After flashing for 60 seconds at 265° F., the sheet containing the adhesive had excellent tack.

*Example 4*

This example relates to the preparation of a 50–50 copolymer of ethylhexyl acrylate and vinyl propionate.

A solution consisting of 200 parts isopropyl acetate, 250 parts ethylhexyl acrylate and 5 parts benzoyl peroxide was added dropwise over a 3-hour period to a flask containing 250 parts vinyl propionate and 250 parts isopropyl acetate. The reaction mixture was maintained at a temperature between 80° C. and 89.1° C. with continuous agitation. After 1 hour reflux, 1.25 parts benzoyl peroxide and 50 parts isopropyl acetate were added to the reaction mixture. After refluxing another hour, the reaction mixture was then cooled to room temperature. The final product had the following properties:

Total solids (percent) _____ 51.5
Viscosity (Gardner-Holdt) _____ Z

The product was applied to unprimed vinyl sheet and flashed for 60 seconds at 265° F. to 267° F. Initial tack was good.

*Example 5*

This example relates to the preparation of a 60–40 copolymer of ethylhexyl acrylate and vinyl acetate. The following solutions were made up:

SOLUTION A

| | Parts |
|---|---|
| Ethylhexyl acrylate | 90 |
| Vinyl acetate | 60 |
| Isopropyl acetate | 55 |

SOLUTION B

| | |
|---|---|
| Isopropyl acetate | 25 |
| Benzoyl peroxide | 1.5 |

Solution A (75 parts) was added to a suitable vessel and purged with nitrogen. Solution B (5 parts) was added thereto and heated to reflux at 90° C. The remainder of solution A was added dropwise over a 1-hour period and during the same 1-hour period, increments of solution B (5 parts) were added every 15 minutes. After the said 1-hour period, the remainder of solution B was added to the reaction medium. Isopropyl acetate (75 parts) was then added and the reaction mass was refluxed for 2 hours, after which more isopropyl acetate (50 parts) was added. The final product, which was slightly hazy, had the following properties:

| | |
|---|---|
| Total solids (percent) | 41.9 |
| Viscosity (Gardner-Holdt) | $Z_4$ |
| Standard Williams plasticity number | 2.8–3 |

The product was cut to 30 percent solids with isopropyl alcohol, which then had a viscosity (Gardner-Holdt) of V. This product, which was clear, was applied to a polyvinyl chloride backing and flashed at 265° F. for 1 minute. The flashed film, which was 0.2 mil thick, had good tack and no leg, and had excellent adhesion to the backing.

Although specific examples of the invention have been set forth hereinabove, it is not intended that the invention be limited solely thereto, but to include all of the variation and modifications falling within the scope of the appended claims.

We claim:

1. A normally tacky and pressure-sensitive adhesive-coated article comprising a non-fibrous backing member having superimposed thereon a dried film consisting of a solution-polymerized interpolymer of monomers consiting esesntially of
    (1) from about 40 percent to about 85 percent of at least one compound of the formula

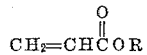

where R is an alkyl radical having from 4 to 18 carbon atoms and
    (2) from about 60 percent to about 15 percent of a compound of the formula

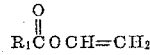

where $R_1$ is an alkyl radical having from 1 to 5 carbon atoms,
    said interpolymer having a viscosity of at least 3000 centipoises as a 50 percent solution in isopropyl acetate and a Williams plasticity between about 1.4 and about 3.

2. The article of claim 1 in which R is an alkyl radical having 8 carbon atoms.

3. The article of claim 1 in which R is an alkyl radical having from 8 to 14 carbon atoms and $R_1$ is a methyl radical.

4. The article of claim 1 in which R is an alkyl radical of 8 carbon atoms and $R_1$ is a methyl radical.

5. The article of claim 1 in which said backing member is polyvinyl chloride.

6. The article of claim 1 in which said backing member is regenerated cellulose.

7. The article of claim 1 in which said backing member is terephthalic polyester.

8. The article of claim 1 in which said backing member is polychloroprene.

9. A normally tacky and pressure-sensitive adhesive-coated article comprising polyvinyl chloride having superimposed thereon a dried film consisting of a solution polymerized interpolymer of monomers consisting essentially of from about 50 percent to about 65 percent of an alkyl arcylate having 8 to 14 carbon atoms in the alkyl portion and about 50 percent to about 35 percent of a vinyl ester having 4 to 8 carbon atoms, said interpolymer having a viscosity of at least 3000 centipoises as a 50 percent solution in isopropyl acetate and a Williams plasticity between about 1.4 and about 3.

10. The article of claim 9 in which said alkyl acrylate is ethylhexyl acrylate, and said vinyl ester is vinyl acetate.

References Cited by the Examiner

UNITED STATES PATENTS

| | | | |
|---|---|---|---|
| Re. 24,906 | 12/1960 | Ulrich | 117—122 X |
| 2,412,475 | 12/1946 | Semegen | 260—86.1 X |
| 2,575,585 | 11/1951 | Cox et al. | |
| 2,925,174 | 2/1960 | Stow | 117—161 X |
| 2,939,270 | 6/1960 | Martin | 117—161 |
| 2,947,650 | 8/1960 | Gerhardt et al. | 117—122 |
| 2,953,475 | 9/1960 | Bergstedt et al. | 117—122 |
| 3,189,581 | 6/1965 | Hart et al. | 117—122 X |

OTHER REFERENCES

Horn: "Acrylic Resins," Reinhold Publ. Corp., New York, 1960, page 148.

WILLIAM D. MARTIN, *Primary Examiner.*

H. E. COLE, W. D. HERRICK, *Assistant Examiners.*